June 5, 1951 W. CRATTY 2,555,573
BRIDLE BIT
Filed July 14, 1949

INVENTOR.
William Cratty
BY
Mason, Fenwick & Lawrence
ATTORNEYS

Patented June 5, 1951

2,555,573

UNITED STATES PATENT OFFICE 2,555,573

BRIDLE BIT

William Cratty, Hialeah, Fla.

Application July 14, 1949, Serial No. 104,686

1 Claim. (Cl. 54—7)

This invention relates to bridle bits especially designed to control the horse or other animal through pressure upon a definite restricted area of the cheek, above and slightly to the rear of the corner of the mouth, which is known to be more tender or sensitive than any other spot over which a bit can exert a controlling touch, excepting of course, the mouth itself.

One of the objects of the invention is to provide a humane bit by means of which the animal can be controlled or directed, or automatically coming into play when the animal attempts to run in or out, for directing him to a straight course without dragging excessively upon the corners of the mouth.

Another object of the invention is to provide a bit which includes normally upwardly extending cheek bars rigid therewith, which move rearwardly through a small arc when the bit is tilted through the tightening of either rein, aligning themselves with this sensitive spot and pressing against one or the other of said spots, depending upon which rein is pulled, causing the horse to turn away from the source of pressure.

Other objects of the invention will appear as the following description of a preferred and practical embodiment thereof proceeds.

In the drawing which accompanies the following specification and throughout the several figures of which the same reference numerals have been used to denote identical parts:

Figure 1:
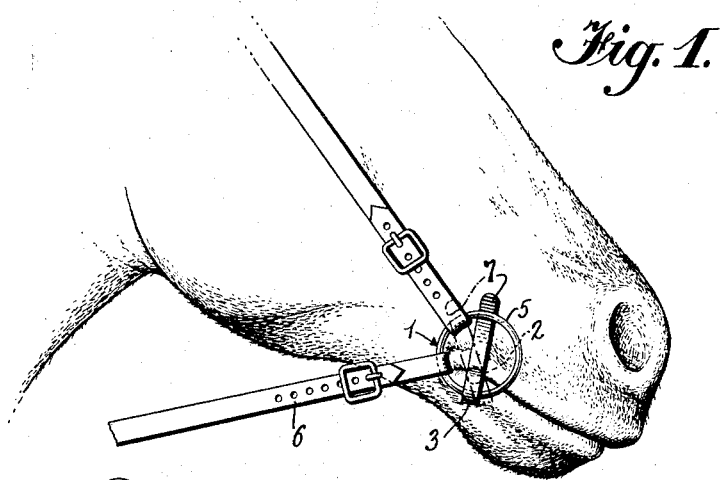
Figure 1 is a side elevation of a bridle bit embodying the principles of the invention, shown in its relation to the bridle strap.

Referring now in detail to the several figures, the bit, which in general is designated by the numeral 1, comprises a straight shank 2, preferably round in cross-section, long enough when in the horse's mouth to extend beyond the lips a sufficient distance to prevent those parts which are carried at the ends of said shank from pressing the horse's lips against the teeth. At its ends, the shank 2 is provided with the integral downwardly extending lugs 3, having holes 4 therethrough, the axes of which holes lie in planes perpendicular to the axis of the shank. The bit rings 5 are hingedly mounted in said holes. The rings 5 occupy an upright position, extending above the shank 2. Since the rings are arcuate and the holes 4 are straight, the rings will not readily move circumferentially through the holes, but when the rear side of either lip is pulled by tightening of the rein 6, or its companion rein on the opposite side of the bridle, the ring will tilt the bit rearwardly about the axis of the shank 2. The bit structure as specifically described up to this point, is conventional.

Figure 2:
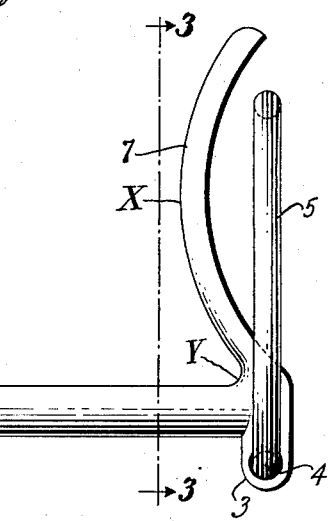
Figure 2 is a front elevation of the bit.
Figure 3:
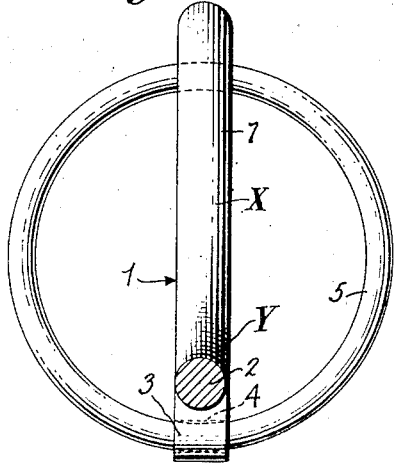
Figure 3 is a section taken along the line 3—3 of Figure 2.
Figure 4:
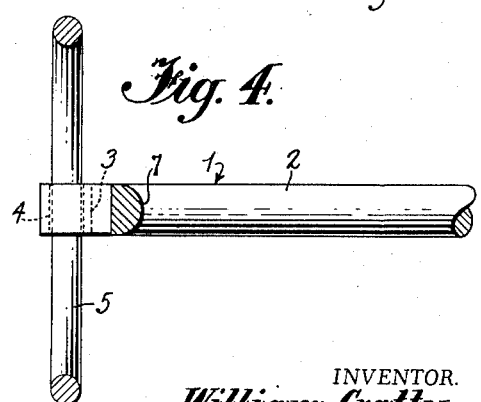
Figure 4 is a section taken along the line 4—4 of Figure 2.

That which distinguishes the subject bit from known bits and radically changes its mode of operation are the cheek bars 7 which are integral with the shank 2, emanating from said shank opposite the lugs 3, and which lie in the common diametrical plane of said rings which embraces the axis of the shank 2. Viewed from the front as in Figure 2, the cheek bars 7 are seen to be convex inwardly, that is, toward the cheeks of the horse, the peak of convexity X being at an intermediate point in the length of the cheek bars so that a bulge or bay Y is formed in the space between said cheek bars at their base, allowing room for the lips of the horse even though the cheek bar is in pressure contact with the cheek, thereby preventing the lips of the horse from being forced against the teeth. It will be noted that the contour of the bit, especially in the region of these bulges, is of smooth curvature, ensuring that the animal's mouth will not be injured. The length of the cheek bars is so determined that the peak of convexity moves in an arcuate path which passes over the sensitive spot referred to, registering with that spot on each side but touching neither when the horse is moving straight ahead and both reins are pulled with uniform pressure. If the horse attempts to turn to one side, it tightens the rein on one side, which tilts the bit rearwardly, bringing one of the cheek bars into pressure contact with the sensitive spot on that cheek toward the direction of turn. The horse will immediately turn away from the source of pressure. In directing the horse, one rein or the other will be pulled, tilting the bit to the rear and forcing one or the other of the cheek bars into pressure contact with the sensitive spot on the cheek.

From the above description it will be understood that I have provided a universal and humane run-out bit to prevent a horse or any animal for which a bit is used, from bearing in or out, or to direct the animal. This bit makes it possible for the rider to have perfect control over the horse at all times. It is also especially advantageous with colts when they are being broken, and where cut mouths are frequent. This bit because of its novel construction as described will not cut, tear or injure the animal's mouth in any way.

While I have in the above description disclosed what I believe to be a preferred and practical embodiment of the invention it will be understood by those skilled in the art that the specific details of construction and arrangement of parts, as shown, are by way of illustration and not as limiting the scope of the invention.

What I claim as my invention is:

Bridle bit comprising a straight shank, similarly positioned rein rings at the ends of said shank secured thereto at points in their lower arcs and upstanding therefrom in parallel planes, and cheek bars rigid with said shank extending upwardly from the ends thereof in a common diametrical plane of said rings which embraces the axis of said shank, said cheek bars lying on the inside of said rings, being uniformly convex in an inward direction, having their free ends extending above said rings, the peak of convexity being at intermediate points in the length of said cheek bars, said cheek bars and shanks at their points of juncture forming outwardly directed angular bays to give room for outward distortion of the horse's lip at the corners when the bit is pulled.

WILLIAM CRATTY.

REFERENCES CITED

The following references are of record in the file of this patent:

UNITED STATES PATENTS

| Number | Name | Date |
|---|---|---|
| 1,113,863 | Baskin | Oct. 13, 1914 |
| 1,476,999 | Oelkers | Dec. 11, 1923 |

FOREIGN PATENTS

| Number | Country | Date |
|---|---|---|
| 447,356 | Great Britain | May 18, 1936 |